United States Patent [19]

Egidi et al.

[11] 4,405,555
[45] Sep. 20, 1983

[54] PROCESS AND DEVICE FOR VULCANIZING POWER TRANSMISSION BELTS

[75] Inventors: Paolo Egidi, Monza; Fulvio Franchino, Milan, both of Italy

[73] Assignee: Industrie Pirelli S.p.A., Milan, Italy

[21] Appl. No.: 279,011

[22] Filed: Jun. 30, 1981

[30] Foreign Application Priority Data

Jul. 18, 1980 [IT]  Italy ............................... 23522 A/80

[51] Int. Cl.³ .......................... B29H 5/18; B29H 5/00; B29D 29/00; B29D 7/22
[52] U.S. Cl. .................................... 264/315; 264/326; 264/327; 425/28 B; 425/34 B; 425/35; 425/40
[58] Field of Search ....................... 264/315, 326, 327; 425/28 B, 34 B, 35, 40

[56] References Cited

U.S. PATENT DOCUMENTS

| | | | |
|---|---|---|---|
| 2,599,046 | 6/1952 | Brucker | 264/315 |
| 2,600,775 | 6/1952 | Hurry et al. | 264/315 |
| 2,647,280 | 8/1953 | Leguillon | 264/315 |

FOREIGN PATENT DOCUMENTS 509451  8/1976  U.S.S.R. ........................ 425/28 B

*Primary Examiner*—H. S. Cockeram
*Attorney, Agent, or Firm*—Stevens, Davis, Miller & Mosher

[57] ABSTRACT

A process is provided for vulcanizing a vulcanizable endless belt which is substantially V-shaped in cross-section, substantially uniformly, by heating the belt through its minor base and converging sides and then cooling the belt from its minor base and converging sides more rapidly than cooling of the major base. An apparatus for practicing the process has a drum and a substantially concentric jacket in spaced relation about the drum. An annular inflatable diaphram is disposed in the space between the drum and jacket. A belt to be vulcanized is placed in an annular groove in the drum, the diaphram is inflated to press the belt in the groove against the surfaces thereof. The surfaces of the groove facing the minor base and the converging sides are heated while the major base is flush with the surface of the drum and is not heated. Cooling water is run through conduits adjacent the minor base and converging sides of the belt to accelerate cooling of the belt while the major base is cooled only by exposure to air.

11 Claims, 1 Drawing Figure

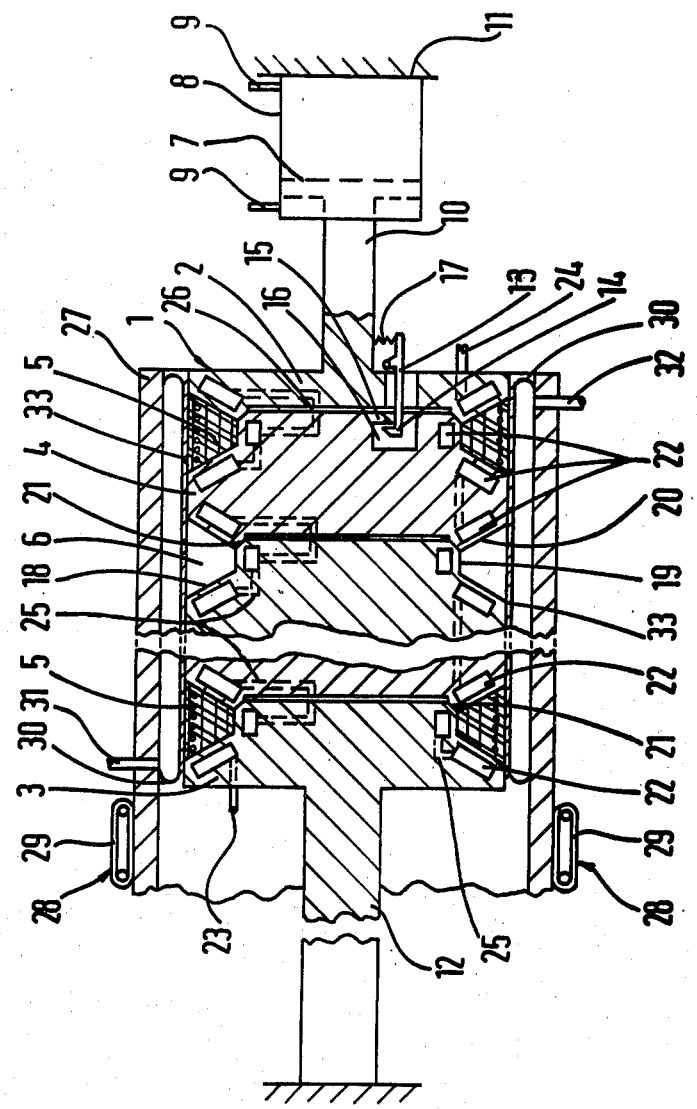

PROCESS AND DEVICE FOR VULCANIZING POWER TRANSMISSION BELTS

This invention relates to a process and to an apparatus for vulcanizing endless power transmission belts and, more particularly, to a process and to an apparatus for vulcanizing and molding power transmission belts, as, for example, V-belts, of cross-linkable elastomeric or plastomeric material.

In the known processes for vulcanizing power transmission belts such as drive belts there is the problem of vulcanizing the inside of the belt body without overvulcanizing the lateral surfaces of the belt which are the first to receive the heat and through which the heat must pass to reach the innermost belt zone.

In fact, in the known devices for vulcanizing power transmission belts, heat is supplied usually from the outside of a rigid sleeve on which the belts are mounted during vulcanization. It follows that the heat in order for it to reach those layers farthest from the heat source, must be applied to the surfaces near the heat source for longer times than strictly necessary for vulcanizing the nearest surfaces. Consequently, these surfaces will be vulcanized excessively and, generally speaking, will be more rigid than the other parts of the belts.

This shortens the lifetime of the belt, in particular if the overheated surface is the smaller base of the belt which is the part of the belt which is stressed mechanically the most during use.

This problem of correct vulcanization of the surfaces of the belts is apparent in particular in V-shaped drive belts since these belts work on two of their four sides (i.e. on the flanks) and therefore correct and uniform vulcanization of these parts is very important.

Moreover, almost all of the breaking of the power transmission belts as they are used occurs because of ruptures starting in the smaller base and then spreading to the remaining part of the body of the belt. Therefore, correct vulcanization of this side is important to improve the lifetime of the driving V-belts.

Another unsolved problem in the known processes for vulcanizing power transmission belts of elastomeric material and, in particular, of vulcanizing belts which are V-shaped in cross-section is assured that during vulcanization and subsequent cooling of the belt, correct arrangement of the tension resistant insert member of the belt is maintained.

An object of the present invention is to provide a process which overcomes the drawbacks of the known processes and, in particular, to provide a process which guarantees complete vulcanization of the body of the power transmission belt, by vulcanizing at the same time at least three sides of the belt and by assuring the maintenance of a correct arrangement of the tension resistant insert member in order to guarantee good operation and a long belt lifetime.

A further object of the present invention is to provide a device for vulcanizing power transmission belts in accordance with the process of the invention and to produce belts which have improved characteristics.

It is an object of this invention to provide a process for making improved power transmission belts such as V-shaped drive belts. Another object of the invention is to provide an improved process for vulcanizing V-belts of elastomeric or plastomeric material. Still another object of the invention is to provide a process for vulcanizing elastomeric or plastomeric power transmission belts which vulcanizes the belt completely without adversely affecting the arrangement of the tension resistant member embedded in the belt. A still further object of the invention is to provide an apparatus for vulcanizing power transmission belts in accordance with the novel process.

Other objects will become apparent from the following description with reference to the accompanying drawing wherein one embodiment of an apparatus for practicing the belt vulcanization process of the invention is illustrated, partially in longitudinal section.

The foregoing objects and others are accomplished in accordance with the invention, generally speaking, by providing a process for vulcanizing substantially uniformly a vulcanizable elastomeric or plastomeric endless power transmission belt which is substantially V-shaped in cross-section having minor and major bases and sides which converge from the major base to the minor base to provide flanks for engaging corresponding surfaces and rotate a pulley. The belt is vulcanized substantially uniformly by heating the belt to the vulcanizing temperature by exposure of only its minor base and flanks to heated surfaces and by exposure of the minor base and flanks to a lower temperature when the temperature to which the major base is exposed to cool the belt to ambient temperature.

The invention also provides an apparatus for practicing the process which has a substantially cylindrical drum provided with at least one annular groove corresponding in cross-section substantially to the cross-section of the belt to be cured and having heated surfaces which contact the minor base and flanks of a belt disposed therein with a major base substantially flush with the surface of the drum and a substantially cylindrical, hollow jacket disposed substantially concentrically about but spaced radially outwardly from the surface of the drum. An annular inflatable diaphragm is disposed in the annular space between the inner wall of the jacket and the surface of the drum. Fittings are connected to opposite ends of the diaphragm for inflating the diaphragm with a fluid under pressure to press the belt into the groove against the heated surfaces.

The process of the invention thus comprises the steps of (a) arranging coaxially with each other, a jacket provided in its inside with a flexible diaphragm on a drum provided with at least one circumferential groove in which there is a belt to be vulcanized;

(b) applying pressure on the outermost surface of the belt to be vulcanized by inflating the diaphragm to smooth the belt; and, contemporaneously, (c) heating in a uniform way the belt to be vulcanized along at least three of its sides;

(d) collapsing the diaphragm and removing the jacket;

(e) cooling differentially the belt to complete the vulcanization; and (f) removing the vulcanized belt from the drum.

The invention also provides an apparatus for vulcanizing power transmission belts comprising a drum provided with at least two plates having their outer surfaces faceted so as to define at least one circumferential groove when the plates are in contact with each other, characterized by the fact of comprising heating means placed in correspondence of the facetings in the plates.

In its more general aspects, a process according to the invention for vulcanizing power transmission belts comprises the steps of arranging coaxially with each other a jacket provided in its inside with a flexible diaphragm on a drum provided with at least one circumferential groove within which a belt to be vulcanized is disposed, applying pressure on the outermost surface of the belt by inflating the diaphragm to smooth the belt while the belt is uniformly heated along at least three of its sides, collapsing the diaphragm, moving the jacket and finally cooling differentially the belt so as to complete the vulcanization before removing the belt from the drum.

As a first step of the process of the invention, a rigid jacket is disposed, in coaxial relationship about a collapsible drum, so that the drum becomes completely inserted within the jacket. The drum is provided with at least one circumferential groove having the shape and dimensions of the belt to be vulcanized and within which a belt is disposed. The belt has its convergent sides (i.e. the flanks) and its smaller base in contact with the walls of the groove, while its larger base is substantially at the same level as the cylindrical surface of the drum. The jacket is provided on its inner surface with a flexible diaphragm and as a second step of the process, the diaphragm is inflated to apply pressure on the outermost surface of the belt to be vulcanized and, preferably, on the larger base of the belt, smoothing the larger base as will be described hereinafter, through means for smoothing the belts present on the diaphragm surface which is in contact with the belt.

The diaphragm is inflated by conveying a fluid under pressure into the diaphragm. Preferably the fluid is steam so the belt is heated uniformly along its sides. In fact, the side corresponding to the larger base is heated by means of steam present in the diaphragm, while the other three sides, i.e. the smaller base and the two flanks of the belt are heated uniformly and practically immediately by steam circulating in suitable conduits, the conduits being disposed in the drum in the zones immediately adjacent to the walls of the grooves.

After a sufficient time, determinable by a technician of the field on the basis of the dimensions and of the type of material constituting the belt to be vulcanized, the circulation of steam is interrupted in the conduits adjacent to the grooves and in the diaphragm, the diaphragm is thus collapsed and the jacket can be moved axially until it no longer encompasses the drum.

At this point the step of cooling separately each belt contained in the circumferential grooves on the drum is started.

In fact, cooling of the greater base begins from the moment in which the jacket is removed from its position of coaxial coupling on the drum and takes place through radiation and convection of heat toward the ambient surrounding the drum.

The two flanks of the belt and the smaller base are cooled by circulating a cooling fluid, as for example, cold water, in the conduits adjacent to the walls of the groove.

But, before circulating the water in the conduits, it is preferred to flush the conduits by flowing pressurized air through the conduits.

During cooling, vulcanization of the belts is finished particularly in those innermost layers of the belt where the belt has a greater thickness (i.e. in the area beneath the greater base).

Once this step of differential cooling, with consequent dimensional stabilization of the belts upon the drum, has terminated the step of unloading the belts from the drum can take place.

This step is effected preferably by collapsing the drum into its various parts, for example by moving away each plate making part of the drum from the remaining part of the drum to free the belts present in the grooves in the zones where two adjacent plates come into contact, as will be described hereinafter.

The present invention comprises a device for vulcanizing power transmission belts comprising, in its more general aspects, a drum provided with at least two plates having their outer surfaces facing each other faceted so as to define at least a circumferential groove when said plates are advanced into contact with each other and heating means placed in the plates adjacent to the facetings.

Referring now to the drawing, the apparatus for vulcanizing and molding V-belts comprises a drum 1 formed of at least one right plate 2 and by a left plate 3. At least one intermediate plate 4 is disposed between the two plates 2 and 3.

The radially outermost circumferential surface of each plate directed toward the adjacent plate is provided with such facetings as to define at least one circumferential groove, the groove having the shape and dimensions of the belt to be vulcanized, when the plates are advanced into contact with one another.

Two of the three grooves shown in the drawing have in their inside a V-belt 5 while a third groove (indicated with reference numeral 6) is shown empty for clarification.

The plates can be separated from one another to permit the belts already vulcanized in the grooves to be removed.

In order to obtain this, at least one of the two end plates (the right plate 2 in the FIGURE) is provided with means adapted to move the plate axially to draw it away from the left plate 3 and from the intermediate plate 4.

This means can be of any type and is not part of the inventive idea of the present invention.

These means are, in the preferred embodiment shown in the FIGURE, a piston 7 (indicated with dashed line) inserted in a cylinder 8 is fixed to the ground 11. Cylinder 8 is preferably provided with two inlets/outlets 9 for the fluid under pressure to move stem 10 of piston 7 and the right plate 2 along the axis of the drum 1 in both directions.

Also the left plate 3 can be provided with means suitable to move it axially or plate 3 can be fixed with respect to an outer element (as indicated in the FIGURE) by means of any stationary support 11 to which a rod 12, integral with the left plate 3, is connected.

In order to maintain the various plates constituting the drum 1 connected to one another, even when one or more plates are in open position to permit the discharging of the belts already vulcanized, means are provided to maintain the various intermediate plates 4 connected to one another and to connect the intermediate plates 4 to the end plates 2 and 3.

The connecting means can be of any type and are not an object of the present invention; however, by way of example, pins and corresponding holes or levers movable from outside manually or automatically can be used.

In the FIGURE, an example is shown of these latter which connect the right plate 2 to an intermediate plate 4 and which comprise a lever 13 hinged to the right plate 2 provided with a hook-shaped end 14 which engages in a projection 15 present on the lip of a slot 16 of the intermediate plate 4.

Lever 13 is provided with elastic means such as helical spring 17 at the end opposite to the hook-shaped end which guarantees closure. To separate the two plates, the end of lever 13 is activated as indicated by the arrow in the flange in opposition to spring 17.

A plurality of levers 13 can be present on each plate in order to guarantee effective and sure assembly of drum 1. The plates of drum 1 according to the present invention are provided, as already indicated, with facetings on their outer circumferential surfaces facing the other plates so as to define grooves 6 when the plates are in contact with one another. The end plates 2 and 3 are provided with facetings only on their side directed toward the inside of the drum, while the intermediate plates 4 are provided with facetings on both sides.

The facetings on the two sides of the intermediate plates 4 are not equal to one another. In fact, the left side of each intermediate plate 4 and of the left plate 3, comprises a first conical faceting 18 and a second cylindrical faceting 19, the facetings will be in contact, respectively, with a flank and with the smaller base of the belt 5 which is vulcanized in groove 6 determined by the facetings.

The other side of groove 6 is formed by a second conical faceting 20 symmetrical with respect to the conical faceting 18 present on the left side of each intermediate plate 4 and on the right plate 2.

Contact and centering among the various plates is effected, for example, along two conical surfaces, indicated with 21, each belonging to one of adjacent plates. The surfaces guarantees also tight closure of the grooves 6.

As indicated hereinbefore, the device provided by the invention is characterized by the fact of comprising heating means placed in the plates in correspondence of facetings 18, 19 and 20. The heating means are, in the particular embodiment shown in the FIGURE, circumferential conduits 22 formed in the plates under the surfaces of the facetings 18, 19 and 20 which define the grooves.

Conduits 22 have preferably a quadrangular shape so as to be able to extend substantially for the whole length of the facetings i.e. substantially for the whole extension of the smaller base and of the flanks of the belts to be vulcanized.

Although the FIGURE shows three distinct conduits 22 for each groove 6, two conduits in place of the three conduits 22 may be used. Of the two conduits, one extends along a flank and along the smaller base of the groove 6, while the other conduit extends along the other flank of the belt. In fact, what is essential is that along each flank and along the smaller base of the groove 6 there is a means which heats directly the flanks and the smaller base.

Moreover, the present invention provides means for circulating a heating fluid, such as steam, through the conduits.

The circulating means comprise an inlet union 23 and an outlet union 24 and a plurality of connecting conduits 25 (indicated with dashed line in the FIGURE) to permit steam to pass from one conduit 22 to the adjacent one after that steam has crossed each conduit 22 along the whole circumference of the plate.

To permit steam to circulate through the entire drum 1, the connecting conduits 25 are provided with suitable unions (indicated with 26) between one plate and the adjacent ones. Unions 27 are all aligned with one another (i.e. preferably arranged on only one circumference, the various plates being able to rotate for aligning the unions) to insert or remove intermediate plates 4 in order to vary the number of grooves of the drum 1.

The device according to the present invention provides moreover a cylindrical jacket 27 which can be moved axially with respect to the drum 1. Jacket 27 can assume the position shown in the FIGURE through means of any conventional type which are not part of the present invention. The translating means may be a cylinder-piston device or, as shown in the FIGURE, two or more devices 28 provided with travelling tracks 29 which can move the jacket in one diirection or in the other. According to the dimensions of the drum 1 and in consequence of the dimensions of the jacket 27 which must be such as to cover completely at least all the grooves 6 present on the drum 1, the jacket can be provided with suitable guides to guarantee correct positioning of concentricity with respect to the drum. Jacket 27 is provided on its inner surface with a flexible and inflatable diaphragm 30 of elastomeric material provided in its own inside for instance with a resisant insert, such as a fabric.

Jacket 27 is, moreover, provided with means for conveying a fluid under pressure into the diaphragm, the conveying means comprising an inlet union 31 and an outlet union 32 for fluid under pressure, this latter being a heating fluid, as for example, steam.

Diaphragm 30 is moreover provided with means for smoothing the belts, present on the drum 1 in grooves 6, on its inner surface facing the drum. The smoothing means comprise a low coefficient of friction layer and, in particular, a layer 33 of polytetrafluoroethylene bonded to the surface of the diaphragm 30 directed toward and in contact with drum 1.

The device according to the present invention starting from the moment in which the belts to be vulcanized are placed in the groove 6 of the drum 1, operates as follows:

Jacket 27 is translated by the travelling track devices 28 to the position shown in the drawing.

Drum 1 is thus arranged coaxially with the jacket 27.

At this point inlet union 31 is connected with a suitable steam source at the desired pressure and temperature to inflate the diaphragm 30 and apply pressure by means of the layer 33 on the larger base of the belts to be vulcanized, the pressure tending to smooth out the belts. Simultaneously with the connection of the inlet union 31, also the outlet union 32 is connected to a suitable drainage element.

As pressure is exerted against the larger base of the belt, the inlet unions 23 and the outlet unions 24 of the various conduits 22 are connected with a steam source. In this way, every single belt 5 to be vulcanized receives heat the same time through all the surfaces of the facetings 18, 19, 20 and through the layer 33 receiving thus the heat in uniform manner through all its four sides.

When the heat supplied to the belts has vulcanized completely in the desired way at least the portion of the belts adjacent to the two convergent lateral flanks and the smaller bases of the belts, the circulation of steam is interrupted, the diaphragm 30 is deflated and the jacket 27 is translated axially by the travelling track device 28 until drum 1 is completely removed from jacket 27. At this point inlet unions 23 and outlet unions 24 are connected, respectively, with a compressed air source and with a drainage element to the conduits 22.

When washing of the conduits 22 has ended, inlet unions 23 and outlet unions 24 are connected, respectively, with a source of cold fluid, such as water, and with a suitable drainage element. In this way a differentiated cooling of the four sides of the belt is effected since the smaller base and the two convergent lateral flanks of the belt are force cooled by the water circulating in the conduits 22 adjacent to the walls of the groove 6 and in particular of the facetings 18, 19 and 20, while the larger base is cooled much more slowly by convection and radiation.

Vulcanization of the elastomeric material is thus stopped practically immediately along the sides of the belt corresponding to the two convergent lateral flanks and to the smaller base, while vulcanization continues of the innermost material of the belt body and also in the layers underlying the larger base.

When vulcanization has been effected completely also in the body of the belt and the belt has been completely vulcanized, the unions 23 and 24 are detached from their connection and the vulcanized belts can be removed from drum 1.

To effect this, the means blocking the various plates are set in action, for example the end of the lever 13, to disengage it from projection 15 present on the intermediate plate 4 adjacent to the right plate 2. Then, sending fluid under pressure into the cylinder 8 through the union 9, translates piston 7 towards the right; piston 7 moves away from the other plates of drum 1 and the vulcanized belt present in groove 6 adjacent to the right plate 2 can be removed from groove 6. Subsequently the fluid under pressure is conveyed into cylinder 8 to translate piston 7 towards the left side and the hook-shaped end 14 of the lever 13 is engaged in the projection 15 present in intermediate plate 4.

At this point cylinder 8 can be activated again to translate the right plate 2 together with the intermediate plate 4 adjacent to it towards the right side after having disengaged the intermediate plate 4 from the adjacent one placed to its left, to free and to remove the second of the vulcanized belts present on the drum.

Alternatively, the removal of the vulcanized belts can be made manually after the right plate 2 has been transferred toward the right for the first time freeing the single intermediate plates 4, one at a time, from the remaining part of the plates still forming the drum 1.

When all the vulcanized belts have been removed, the drum 1 can be reassembled with the various plates associated with one another, placing again the right plate 2 in contact with the remaining plates and the previously described cycle can be started anew.

By means of the process and device for vulcanizing driving belts according to the present invention the objects of the invention are achieved.

In fact the process provided by the invention permits production of power transmission belts and in particular power transmission V-belts which are devoid of the drawback of having one of their surfaces overheated as in the belts of the prior art in which the heat reaches the belt mainly through only one side.

The process according to the present invention makes it possible to heat uniformly the belt on its four sides and in particular permits, thanks to the presence of the conduits in the body of the plates adjacent to the walls of the facetings, to heat in a uniform way and to furnish the heat at the desired rate at least to the three more delicate sides of the belt.

In this way an advancement (or flow) of heat to the inside of the belt is obtained along isothermal lines substantially parallel to the sides of the belt with correct and uniform vulcanization of the whole surface of at least the lateral flanks and of the smaller base.

Because of the particular way of advancing heat through the inside of the belt during the "vulcanization" phenomenon, the elastomeric material first softens and then cross-linking of the elastomer occurs with consequent hardening and because the elastomeric material is a good heat insulator, when the softening of the elastomeric material of the larger base of the belt occurs, in proximity of which the tension resistant insert is positioned, a substantial hardening of underlying elastomeric material has already taken place and this assures perfect maintenance of the position of the tension resistant insert member in the belt.

Moreover, the differential cooling made on the belt assures that vulcanization of the belt sides, corresponding to the convergent lateral flanks and to the smaller base is discontinued at the desired time since cooling of the three sides in contact with the metallic walls of the groove occurs almost instantaneously because the cooling water circulating inside the conduits is opposite the three sides of the belt and is separated from the belt only by a thin metallic wall, and therefore its cooling is very quick.

In this way vulcanization of only the surfaces of the belt which are heated first can be stopped, while because the body of the belt is of thermal insulating material, the inside of the belt continues to cure until it is completely vulcanized. Moreover, since the larger base is cooled slowly the larger portion of the belt adjacent to this side remains heated longer until vulcanized.

Moreover, the larger base is the one which requires the least attention. It is known that belt breaking starts most frequently from the smaller base, while the two lateral flanks are the working surfaces of the belts.

Consequently, if eventual stresses due to cooling were to occur, they would be discharged toward the larger base of the belt. The larger base is the part which is at a greater temperature from moment to moment than the other ones and is the part which is near the tension resistant member inserted in the belt. The tension resistant member is an element which has high tensile strength capacities.

If the four sides of the belt were cooled in an equal way and with equal speed, vulcanization of the whole outer surface of the belt on its four sides would be stopped, while its inside is still hot and, consequently, very expanded. This would cause stresses due to the contraction of the belt around its core with production of microcracks on the cooled surfaces of the belt.

During use microcracks cause premature breaking of the belt since they act as initiating points for breaks. Instead, by leaving one side, and in particular the less delicate side corresponding to the larger base, at a higher temperature, the belt can shrink during cooling in this direction so that the already stabilized three sides are not involved in the phenomenon of concentration of the stresses due to the contraction of the central part of the belt body when it becomes cold.

Therefore it follows that the cooling takes place for isothermal lines substantially parallel and equally spaced from the flanks and smaller base of the belt, while the isothermal lines of the larger base are parallel but much nearer to each other so as to complete the vulcanization of this part of the belt after the beginning of the differentiated cooling with consequent optimum stabilization of the belt and of the tension resistant insert member.

In this way complete vulcanization of the whole belt body is achieved, but without having overheated zones at the more delicate points of the belt.

Moreover, the flashing step of the conduits favors better operation of the device by eliminating condensate or steam pockets in the conduits, the risk of hammer-blows in the conduits is also eliminated when the cold water begins to circulate protecting the various unions present inside the drum.

The device according to the present invention also fulfills the objects of the invention, since substantial steam savings are realized in heating the mold because the forced cooling occurs only near groove 6.

Moreover, the jacket and the diaphragm associated with the jacket are not at all involved in water cooling of the belt, but are cooled only by radiation and convection of the outer surface of the jacket, which however, if desired, can be provided with a layer of insulating material. Therefore, a large part of the body of the mold acts as a thermal flywheel maintaining a great quantity of the heat supplied during the first vulcanization so as to require less consumption of steam for all the subsequent vulcanizations.

Further, by means of the mold according to the present invention the belts are cooled without being immersed in water and therefore no water is absorbed by the body of the belts with consequent possible damage to the tension resistant insert member present in the belts and, moreover, no problems during insertion of the belts into the mold are involved because the belts contact cold surfaces.

Finally, the presence of the layer of low coefficient of friction material, for example, polytetrafluoroethylene on the side of the diaphragm facing the belts, produces a double advantage. On the one hand, the low friction material makes it possible to smooth the outer surface of the belt, both by facilitating, just because of its low friction coefficient, the migration of the rubber from those points where it is overabundant to those where it is scarce, and, being more rigid than the known flexible diaphragms, by exerting a greater and more uniform molding pressure on the surface of the belt which also facilitates migration of the elastomeric material from the zones where it is in excess to the zones where it is scarce.

Although the process and the apparatus for vulcanizing power transmission belts provided by the invention have been illustrated and described in detail, it is to be understood that variations can be made therein by those skilled in the art without departing from the spirit and scope of the invention except as it is limited by the claims.

What is claimed is:

1. A process for vulcanizing vulcanizable endless belts comprising the steps of:
   (a) disposing coaxially to each other a jacket about a drum in radially spaced relationship, said drum having at least one circumferential groove in its surface for insertion of an endless belt to be vulcanized, and the resulting assembly having a diaphragm disposed in the space between the jacket and drum;
   (b) inserting the belt in said groove;
   (c) applying pressure on the outermost surface of the belt to be vulcanized by inflating the diaphragm to smooth the belt in the groove and simultaneously heating uniformly and immediately the belt to be vulcanized along at least three of its sides by exposing said sides to the walls of said groove which are directly heated at the same time by heating means disposed in correspondence of the walls of said groove;
   (d) collapsing the diaphragm and moving the jacket away from the drum;
   (e) cooling differentially the belt to complete the vulcanization; and
   (f) removing the vulcanized belt from the drum.

2. The process of claim 1, characterized by the fact that steam is introduced in the diaphragm in step c.

3. The process of claim 2, characterized by the fact that steam is introduced into the diaphragm and into three conduits placed in the drum adjacent to each side of the groove in step c.

4. The process of claim 3, characterized by the fact that a cooling fluid is introduced into said conduits in step e to stop the vulcanization of the smaller base of the belt while the larger base is air cooled.

5. Process according to claim 3, characterized by the fact of comprising before step e the step of flushing said conduits with air.

6. An apparatus for vulcanizing vulcanizable power transmission belts comprising a drum provided with at least two plates having their outer surface faceted to define at least one circumferential groove when said plates are in contact with each other, a jacket coaxial with the drum, a flexible and inflatable diaphragm associated with the inner surface of the jacket, means for smoothing said belt to be vulcanized on the surface of said diaphragm in contact with said drum, means for conveying a fluid under pressure into said diaphragm, heating means disposed in correspondence of said facetings inside said plates, means for cooling differentially the belt to complete the vulcanization.

7. The device of claim 6, characterized by the fact that said heating means are circumferential conduits which extend substantially for the whole extension of said facetings and means for circulating steam inside said conduits.

8. The device of claim 7, characterized by the fact that said conduits are suitable for being connected with means for the circulation of a cooling fluid.

9. The device of claim 6, characterized by the fact that said means for smoothing said belt is a layer of polytetrafluoroethylene.

10. A process for vulcanizing a vulcanizable endless belt which is V-shaped in cross-section having major and minor bases and sides which converge from the major base to the minor base forming the flanks of the belt, said process comprising simultaneously pressing and heating the belt on its minor base and flanks substantially uniformly to its vulcanizing temperature, releasing the pressure on the belt and accelerating cooling of the belt only through its minor base and flanks by contact with a dry surface which is cooled to below the temperature of the surrounding air, exposing the major base to the surrounding air for cooling by radiation only without application of water thereto.

11. An apparatus for vulcanizing an endless belt which is substantially V-shaped in cross-section having a minor base, a major base and sides which converge from the major base to the minor base, said apparatus comprising a drum comprising an annular groove in its surface adapted to house said belt with walls of the groove contacting the minor base and flanks of a belt disposed in the groove and with the major base substantially flush with the surface of the drum, means for selectively heating said walls of the groove and the parts of the belt disposed thereagainst, an annular jacket disposed in spaced relation concentrically about the drum, an annular inflatable diaphragm disposed in the space between the drum and jacket, means for flowing steam into the diaphragm to simultaneously inflate the diaphragm to fill said space therewith and to press against the major base of the belt in the annular groove, means for exhausting of steam from the diaphragm to deflate it, and means for moving the jacket longitudinally with respect to the drum when the diaphragm is deflated.

* * * * *